United States Patent
Karino

(10) Patent No.: US 8,010,166 B2
(45) Date of Patent: Aug. 30, 2011

(54) HANDSFREE APPARATUS FOR VEHICLE

(75) Inventor: Shuji Karino, Kariya (JP)

(73) Assignee: Denso Corporation, Kariya (JP)

( * ) Notice: Subject to any disclaimer, the term of this patent is extended or adjusted under 35 U.S.C. 154(b) by 381 days.

(21) Appl. No.: 12/316,755

(22) Filed: Dec. 16, 2008

(65) Prior Publication Data

US 2009/0170568 A1    Jul. 2, 2009

(30) Foreign Application Priority Data

Dec. 26, 2007    (JP) ................. 2007-334311

(51) Int. Cl.
 *H04W 4/00* (2009.01)
(52) U.S. Cl. ............... 455/569.2; 455/414.1; 455/567
(58) Field of Classification Search ............... 455/569.2, 455/414.1, 567
See application file for complete search history.

(56) References Cited

U.S. PATENT DOCUMENTS

| | | |
|---|---|---|
| 2003/0114202 A1 | 6/2003 | Suh et al. |
| 2003/0224840 A1 | 12/2003 | Frank et al. |
| 2008/0039153 A1 | 2/2008 | Katoh et al. |
| 2008/0096613 A1 | 4/2008 | Karino |

FOREIGN PATENT DOCUMENTS

| | | |
|---|---|---|
| EP | 1513327 | 3/2005 |
| JP | 10-304464 | 11/1998 |
| JP | 2000-270051 | 9/2000 |
| JP | 2003-069664 | 3/2003 |
| JP | 2003-198713 | 7/2003 |
| JP | 2003-218996 | 7/2003 |
| JP | 2004-222039 | 8/2004 |
| JP | 2005-086254 | 3/2005 |
| JP | 2005-110051 | 4/2005 |
| JP | 2005-269519 | 9/2005 |
| JP | 2006-311143 | 11/2006 |
| JP | 2008-042717 | 2/2008 |
| JP | 2008-103911 | 5/2008 |

OTHER PUBLICATIONS

Office action dated Nov. 4, 2009 in corresponding Japanese Application No. 2007-334311.

*Primary Examiner* — Pierre-Louis Desir

(74) *Attorney, Agent, or Firm* — Harness, Dickey & Pierce, PLC

(57) ABSTRACT

A cellular phone receives an incoming call from a communication network in a state where an in-vehicle navigation apparatus cannot execute a handsfree control relative to the incoming call. If a permission for a notice of an incoming call is set, a display device displays information of "under an answer suspension state" indicating that an answer to the relative incoming call is being suspended. A user can recognize via the navigation apparatus that an answer to an incoming call is under the answer suspension state, thus concentrating on driving operation without need of manipulating the cellular phone to respond to the incoming call.

8 Claims, 3 Drawing Sheets

HANDSFREE APPARATUS FOR VEHICLE

CROSS REFERENCE TO RELATED APPLICATION

This application is based on and incorporates herein by reference Japanese Patent Application No. 2007-334311 filed on Dec. 26, 2007.

FIELD OF THE INVENTION

The present invention relates to an in-vehicle handsfree apparatus that execute a handsfree incoming control when receiving an incoming notice signal from a cellular phone in a control executable state where the handsfree incoming control can be executed.

BACKGROUND OF THE INVENTION

Patent document 1: JP-2003-198713 A (corresponding to US-2003/0114202)
Patent document 2: JP-2003-218996 A A cellular phone compliant to a Bluetooth (registered trademark) communication function becomes widely used. In connection with it, an in-vehicle handsfree apparatus for establishing a Bluetooth communication link with the above cellular phone has been offered (for example, Patent documents 1, 2).

In such an in-vehicle handsfree apparatus, when the cellular phone receives an incoming signal via a communication network while establishing the Bluetooth communication link between the in-vehicle handsfree apparatus and the cellular phone, the cellular phone sends an incoming notice signal or call to the handsfree apparatus. Upon receiving it, the handsfree apparatus executes the handsfree incoming control to give a notice for indicating that the cellular phone has received the incoming call while prohibiting the cellular phone from outputting an incoming ringer tone.

In contrast, an in-vehicle navigation apparatus having a handsfree function connectable with multiple communication terminals is offered. A cellular phone may receive an incoming signal from a communication network in a state where the in-vehicle navigation apparatus cannot execute a handsfree incoming control relative to the incoming signal. In such a case, the navigation apparatus has a difficulty in executing a handsfree incoming control. The user needs to operate the cellular phone, instead of operating the navigation apparatus, to answer the incoming signal. Herein, it is not a problem if the navigation apparatus is operated while the vehicle is parked or stopped; however, if the vehicle is running, it becomes a cause to interfere the safety of driving the vehicle. This is not desirable.

SUMMARY OF THE INVENTION

It is an object to provide an in-vehicle handsfree apparatus which can improve convenience of a user when a cellular phone receives an incoming signal from a communication network in a state where the in-vehicle handsfree apparatus cannot execute a handsfree incoming control.

According to an example of the present invention, a handsfree apparatus for a vehicle is provided as follows. A cellular phone communication device is configured to receive, in a state of establishing a communication link with a cellular phone, an incoming notice signal from the cellular phone in connection with an incoming signal having been received by the cellular phone from a communication network. A control circuit is configured to execute a handsfree incoming control when the cellular phone communication device receives the incoming notice signal from the cellular phone in a control executable state where the handsfree incoming control is executable. An answer suspension notice device is configured to give an answer suspension notice for indicating that an answer to an incoming signal is being suspended. Herein, in a control inexecutable state where the handsfree incoming control is inexecutable when the cellular phone communication device receives from the cellular phone an incoming notice signal relative to an incoming signal, the control circuit is further configured to give a suspension notice for indicating that an answer to the incoming signal is being suspended, via the answer suspension notice device.

Thus a user can recognize via the in-vehicle handsfree apparatus that an answer to an incoming signal is being suspended, thus concentrating on driving operation without need of manipulating the cellular phone to respond to the incoming signal. A convenience of the user can be improved.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
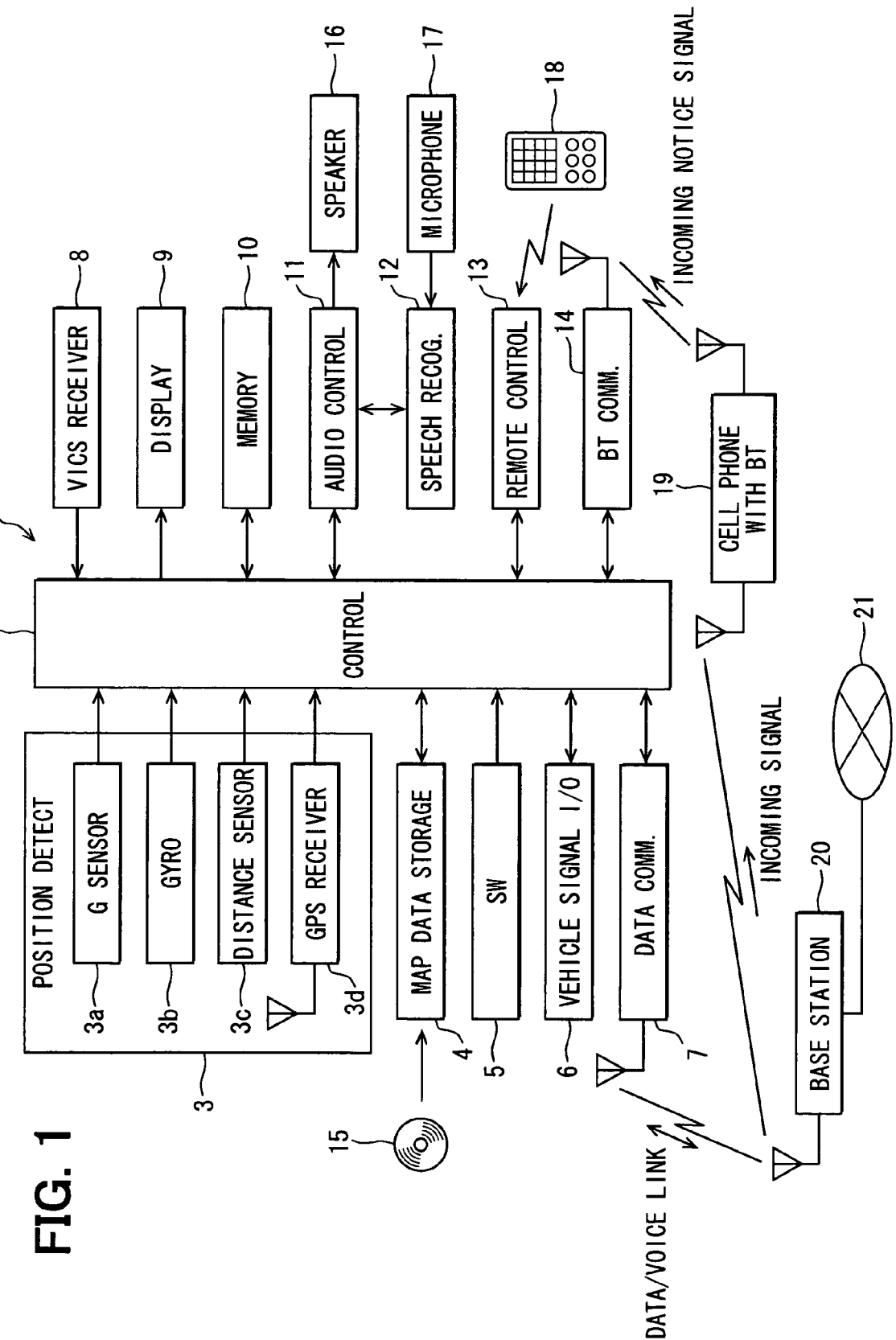
FIG. 1 is a functional block diagram according to an embodiment of the present invention.
Figure 2:
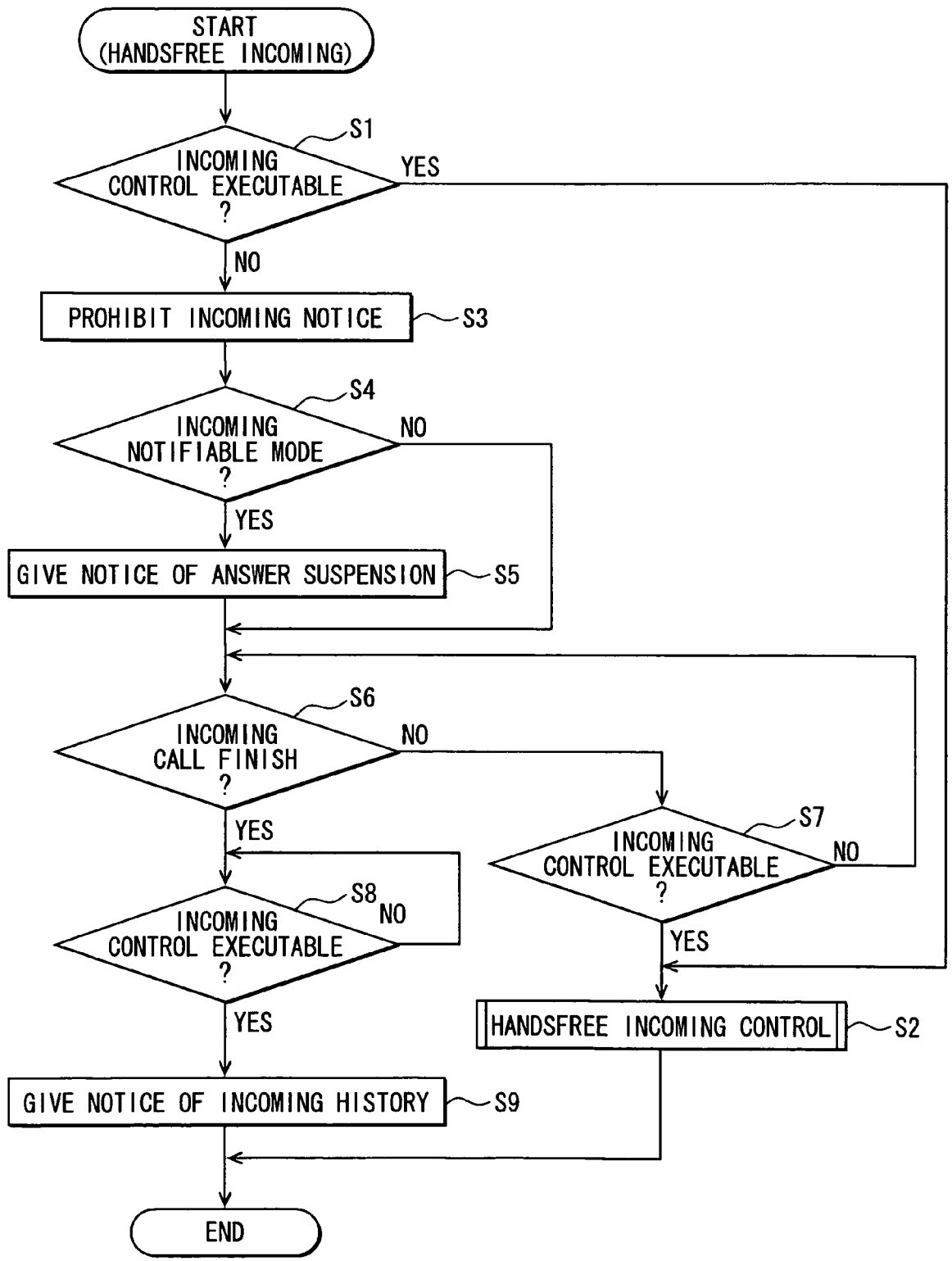
FIG. 2 is a flowchart.

The present invention is explained with reference to drawings about an embodiment applied to an in-vehicle navigation apparatus with a handsfree function and a Bluetooth communication function. FIG. 1 indicates a functional block diagram of an in-vehicle navigation apparatus. An in-vehicle navigation apparatus 1 mounted in a subject vehicle includes the following: a control circuit 2 (also functioning as an example of a control means or device, or a setting means or portion); a position detection device 3; a map data storage device 4; an operation switch group 5; a vehicle signal input/output device 6; a data communication device (data communication module) 7; a VICS receiver 8; a display device 9 (also functioning as an example of a notice means or device for giving a notice of an answer suspension, an incoming, or an incoming history); a memory 10; an audio controller 11; a speech recognition device 12; a remote control sensor 13; and a Bluetooth communication device 14 (also functioning as an example of a cellular phone communication means or device, or an incoming history acquisition means or device).

The control circuit 2 includes a CPU, ROM, RAM, I/O interface, and a bus connecting the foregoing components (non illustrated) to control an overall operation of the in-vehicle navigation apparatus 1. The position detection device 3 includes a gyroscope 3a, a G sensor 3b, a distance sensor 3c, and a GPS (Global Positioning System) receiver 3d. The sensors or the like 3a to 3d of the position detection device 3 individually have different types of detection errors from each other. Thus, when detection signals are inputted from individual sensors or the like of the position detection device 3, the control circuit 2 complements the inputted detection signals mutually, and designates or detects a present position, a heading direction, a speed, a travel distance, etc. of the vehicle. In addition, all the sensors or the like 3a to 3d of the position detection device 3 may not be necessary depending on required detection accuracy. Moreover, the position detection device 3 may further include a wheel sensor for detecting rotation of wheels or a rotation sensor for detecting rotation of a steering wheel.

The map data storage device 4 stores map data transmitted, for example, from a storage medium 15, such as a DVD-ROM. In such a case, the storage medium 15 may be a HDD, a memory card, etc., for example. The operation switch group 5 includes a mechanical switch around the display device 9 or a touch switch on a screen (e.g., liquid crystal display) in the display device 9. The vehicle signal input/output device 6 outputs and inputs various signals between various ECUs (Electronic Control Units) and various sensors mounted in the vehicle.

The data communication device 7 has a telephone function, establishing a data or audio communication link with a communication network 21 (a public telephone network, a public packet network). The data communication link is used for data communication, while the audio communication link is used for voice call, for instance. The VICS receiver 8 receives VICS (Vehicle Information and Communication System) information from an outside. The display device 9 includes, for example, a color liquid crystal display, and displays various display windows such as a present position display window. Herein, a graphic symbol indicating a present position is superimposed on a map as map data. In addition, the display device 9 may include an organic electroluminescence (EL) or a plasma display. The memory 10 includes a flash memory card etc. which can be detached and attached, for example, and stores various memory information.

The audio controller 11 controls a ringer tone or voice, which is outputted via a speaker 16 functioning as an example of an audio output means or device, and controls voices inputted via a microphone 17 functioning as an example of an audio input means or device. For example, when the control circuit 2 executes a route guidance, an audio guidance for route guidance is outputted via the speaker 16. When the control circuit 2 executes a handsfree call control, the voices received from a call partner are outputted via the speaker 16. The speech recognition device 12 analyzes the voices inputted via the microphone 17 as transmit sounds based on the speech-recognition algorithm. The remote control sensor 13 receives an operation radio wave signal transmitted from the remote control 18, and outputs it to the control circuit 2.

The Bluetooth communication device 14 establishes a Bluetooth communication link with a cellular phone 19 having a Bluetooth communication function when the cellular phone 19 is present within the communication area. In addition, like the above-mentioned data communication device 7, the cellular phone 19 establishes a data or audio communication link with the communication network 21.

Under the above configuration, in the state where the data communication device 7 connects an audio communication link with the communication network 21 via a wireless base station 20, the control circuit 2 outputs voices received from the communication network 21 via the speaker 16, and transmits voices inputted via the microphone 17 to the communication network 21 via the data communication device 7. In contrast, when the Bluetooth communication device 14 connects an audio communication link with the cellular phones 19, and the cellular phone 19 connects an audio communication link with the communication networks 21 via the wireless base station 20, the control circuit 2 outputs voices, which are received by the Bluetooth communication device 14 via the cellular phone 19 from the communication network 21, via the speaker 16, and transmits voices inputted from the microphone 17 to the communication network 21 from the Bluetooth communication device 14 via the cellular phone 19.

Figure 3A:
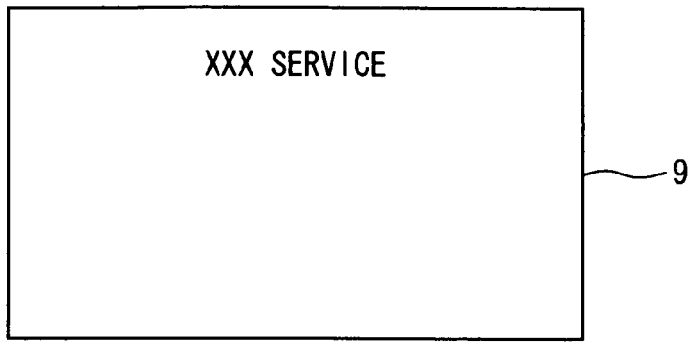
FIGS. 3A to 3D illustrate examples of display windows.

In addition, when the user operates the operation switch group 5 and the remote control 18, the control circuit 2 can selectively set either an incoming notifiable mode in which a notice of (reception of) an incoming signal or call is permitted. or an incoming not-notifiable mode in which a notice of (reception of) an incoming signal or call is not permitted. For instance, the following case is assumed: the control circuit 2 executes an emergency call service or a voice guide service and the data communication device 7 connects a data communication link or audio communication link with the communication network 21 (or an operator center) via the wireless base station 20. In such a case, as illustrated in FIG. 3A, the information about each service presently taking place as useful information for users is displayed in the display device 9, and the speaker 16 and the microphone 17 are occupied by the emergency call service or the voice guide service. Namely, when executing an emergency call service or voice guide service, the user can talk with an operator located in the operator center via the speaker 16 and the microphone 17 to thereby receive the emergency call service or voice guide service.

Next, an operation under the above configuration is explained with reference to FIGS. 2 and 3A to 3D. The control circuit 2 determines whether the Bluetooth communication device 14 receives an incoming notice signal from the cellular phone 19. As a transmission partner (also referred to as a caller or a sender) sends a telephone number of the cellular phone 19 as a destination phone number, the cellular phone 19 receives an incoming signal via the communication network 21 and sends an incoming notice signal. In connection thereto, the Bluetooth communication device 14 thereby determines that an incoming notice signal is received from the cellular phone 19. The control circuit 2 then determines whether a handsfree incoming control can be executed at the time (i.e., whether a handsfree incoming control is executable or in a control executable state) (S1).

Figure 3B:
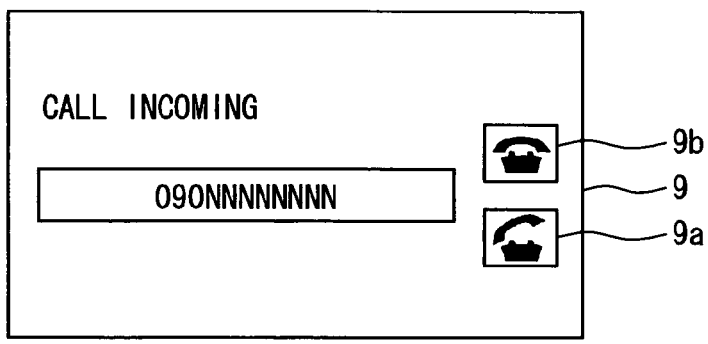

Herein, the data communication device 7 may disconnect a data communication link or audio communication link with the communication network 21. In such a case, when receiving the incoming notice signal from the cellular phone 19, the control circuit 2 determines that a handsfree incoming control can be executed ("YES" at S1). The handsfree incoming control is then executed (S2). As illustrated in FIG. 3B, the control circuit 2 displays information of "call incoming" or "under reception of an incoming call" to indicate that an incoming signal or call is being received, in the display device 9. Further, If the cellular phone 19 receives a sender's telephone number from the communication network 21 with a calling source telephone number notice service (i.e., a caller ID service), the control circuit 2 also displays the sender's telephone number ("N" in FIG. 3B is not-fixed number) in the display device 9. The user then presses a reply key 9a currently formed as a touch key in the display device 9 to be thereby allowed to answer or respond to the incoming call. The handsfree phone call using the speaker 16 and the microphone 17 can be thus performed. In contrast, the user can cut the incoming call by pressing a cutting key 9b. Herein, the control circuit 2 can search telephone book data registered previously, and display a registration name corresponding to the sender's telephone number.

In contrast, for instance, an emergency call service or a voice guide service may be performed. In such a case, the data communication device 7 is connecting a data communication link or audio communication link with the communication networks 21 via the wireless base stations 20 while the speaker 16 and the microphone 17 are occupied by the emergency call service or voice guide service. Thus, when receiving the incoming notice signal from the cellular phone 19, the control circuit 2 determines that a handsfree incoming control can be not executed (i.e., that a handsfree incoming control is inexecutable or in a control inexecutable state) ("NO" at S1). The control circuit 2 prohibits the in-vehicle navigation apparatus 1 from giving a notice of an incoming signal or call (S3). The control circuit 2 then determines whether setting of an incoming notice is in an incoming notifiable mode or in an incoming not-notifiable mode (S4).

Figure 3C:
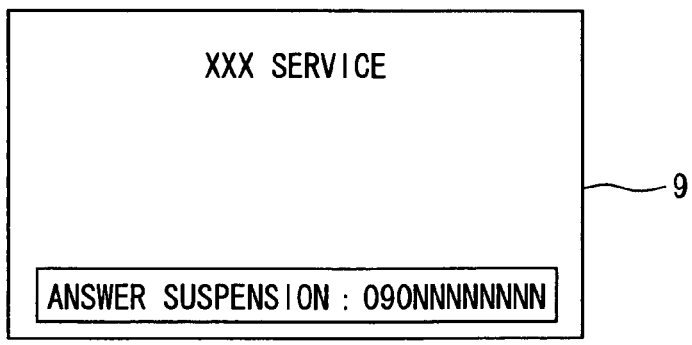

When the control circuit 2 determines that the setting of incoming notice is in the incoming notifiable mode ("YES" at S4), the display device 9 is caused to display information of "under an answer suspension state" indicating that an answer to the relevant incoming signal or call is suspended or being suspended, as shown in FIG. 3C. If the cellular phone 19 receives a sender's telephone number from the communication network 21 with a calling source telephone number notice service (i.e., a caller ID service), the control circuit 2 displays the sender's telephone number in the display device 9 and gives a notice of an answer suspension for indicating that an answer to an incoming signal or call is being suspended (S5). In such a case, the control circuit 2 desirably displays "under an answer suspension state" at a corner of the display area so as not to interfere with information displayed about the service provided at the time. Thereby, the user can recognize the reception of an incoming call while receiving the emergency call service or voice guide service, for example. Herein, similarly, the control circuit 2 can search telephone book data registered previously, and display a registration name corresponding to the sender's telephone number.

Subsequently, the control circuit 2 determines whether the incoming signal or call finishes or not (i.e., the reception of the incoming signal or call ends) (S6). The control circuit 2 also determines whether the handsfree incoming control is switched from the control inexecutable state to the control executable state (S7). Such a determination is made while the incoming signal or the reception of the incoming signal continues before the incoming signal finishes. For instance, performing an emergency call service or a voice guide service is ended and the data communication device 7 disconnects a data communication link or audio communication link with the communication networks 21 via the wireless base stations 20. When the control circuit 2 determines that the handsfree incoming control is switched from the control inexecutable state to the control inexecutable state ("YES" at S7), the above-mentioned handsfree incoming control is executed (S2).

In contrast, before switching from the control inexecutable state to the control executable state, the control circuit 2 may determine that the incoming signal or call or the reception of the incoming signal or call finishes while the control inexecutable state continues ("YES" at S6). In such a case, the control circuit 2 continuously determines whether the handsfree incoming control is switched from the control inexecutable state to the control executable state (S8).

Figure 3D:
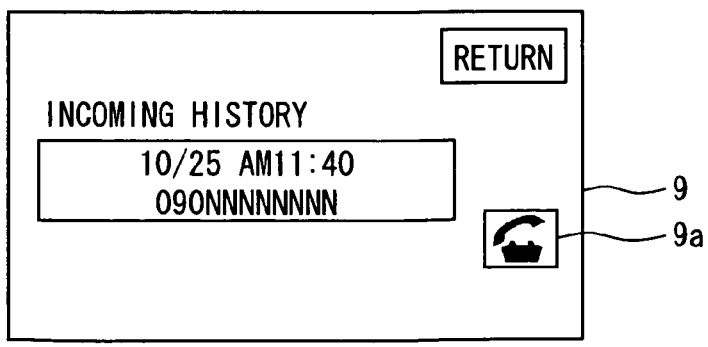

The control circuit 2 then ends performing an emergency call service or a voice guide service, for instance, and the data communication device 7 disconnects a data communication link or audio communication link with the communication networks 21 via the wireless base stations 20. When determining that the handsfree incoming control is switched from the control inexecutable state to the control executable state ("YES" at S8), the control circuit 2 reads an incoming history of the relevant incoming signal or call stored in the cellular phone 19, i.e., causes the cellular phone 19 to forward it. The date and time of the relevant incoming call are displayed in the display device 9 as illustrated in FIG. 3D. Further, if the cellular phone 19 receives a sender's telephone number from the communication network 21 with a calling source telephone number notice service (i.e., a caller ID service), the sender's telephone number is displayed in the display device 9, and the notice of the incoming history is given (S9). Herein, similarly, the control circuit 2 can search telephone book data registered previously, and display a registration name corresponding to the sender's telephone number. Thereby, the user can similarly recognize the incoming history of the incoming signal or call. The user then presses a reply key 9*a* presently formed as a touch key in the display device 9 and can call to the telephone number included in the incoming history.

Further, when determining that the setting of incoming notice is in the incoming not-notifiable mode ("NO" at S4), the control circuit 2 determines whether the incoming signal or call finishes or the reception of the incoming signal or call finishes (S6) without displaying "under an answer suspension state" indicating that an answer to the relevant incoming call is being suspended. The control circuit 2 also determines whether the handsfree incoming control is switched from the control inexecutable state to the control executable state (S7). The above-mentioned process is subsequently executed similarly.

In the above explanation, the control inexecutable state is determined when the control circuit 2 executes an emergency call service or a voice guide service to thereby occupy the speaker 16 and the microphone 17. Even when the control inexecutable state is determined based on another event or cause taking place, the above-mentioned process may be executed similarly. For example, if anomalies (failures) are detected in the speaker 16 or the microphone 17, the control inexecutable state may be determined.

As the mentioned above, the in-vehicle navigation apparatus 1 according to the present embodiment is provided as follows. The cellular phone 19 may receive an incoming signal or call from the communication network 21 in a state (i.e., in a handsfree incoming control inexecutable state) where an in-vehicle navigation apparatus cannot execute a handsfree control relative to the incoming signal or call. In such a case, if a permission for an incoming call notice is set or the incoming notifiable mode is set, the display device 9 displays information of "under an answer suspension state" indicating that an answer to the relevant incoming signal or call is being suspended. Thus, previous setting of the incoming notifiable mode allows a user to recognize, via the navigation apparatus 1, the answer suspension state in which an answer to an incoming signal or call is being suspended. The user thus can concentrate on driving operation without need of manipulating the cellular phone 19 so as to respond to the incoming signal. A convenience of the user can be consequently improved.

In addition, after giving a notice that an answer to an incoming signal or call is being suspended, the control inexecutable state is assumed to be switched to the control executable state while the reception of the incoming signal or call continues. In such a case, the display device 9 displays information of "under an incoming call reception state" indicating that the relevant incoming call is being received. The user can thus recognize that an incoming signal or call is being received and select either answering to the incoming signal or call or disconnecting the incoming signal or call.

In addition, after giving a notice that an answer to an incoming signal or call is being suspended, the reception of the incoming signal may finish and the control inexecutable state may be switched to the control executable state. In such a case, the incoming history of the relevant incoming signal or call is displayed in the display device 9. The user can thus recognize the incoming history (e.g., the date and time of the incoming call, the sender's telephone number, etc.) of the incoming call with the help of the in-vehicle navigation apparatus 1.

The present invention is not limited only to the above-mentioned embodiment, and can be modified or extended as follows. The invention can be directed not only to the in-vehicle navigation apparatus with a handsfree function having a Bluetooth communication function, but also any in-vehicle handsfree apparatus having a Bluetooth communication function. The data communication device may be replaced with another cellular phone or a communication device with a telephone function wired with the in-vehicle navigation apparatus.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A handsfree apparatus for a vehicle, the apparatus comprising:
    a cellular phone communication device configured to receive, in a state of establishing a communication link with a cellular phone, an incoming notice signal from the cellular phone in connection with an incoming signal having been received by the cellular phone from a communication network;
    a control circuit configured to execute a handsfree incoming control when the cellular phone communication device receives the incoming notice signal from the cellular phone in a control executable state where the handsfree incoming control is executable;
    an incoming notice device configured to give an incoming notice for indicating that an incoming signal is being received,
    an incoming history acquisition device configured to acquire an incoming history for indicating that the cellular phone having received an incoming signal from the communication network; and
    an incoming history notice device configured to give a notice of the acquired incoming history,
    an answer suspension notice device configured to give an answer suspension notice for indicating that an answer to an incoming signal is being suspended,
    wherein
    when the cellular phone communication device receives from the cellular phone an incoming notice signal relative to an incoming signal in a control inexecutable state where the handsfree incoming control is inexecutable because an audio output device and an audio input device are being used dedicatedly for other than a handsfree call,
    the control circuit is further configured to give a suspension notice for indicating that an answer to the incoming signal is being suspended, via the answer suspension notice device;
    when the handsfree incoming control is switched from the control inexecutable state to the control executable state after the incoming signal finishes after the answer suspension notice is given via the answer suspension notice device, the control circuit is further configured to automatically give, via the incoming history notice, a notice of the incoming history acquired by the incoming history acquisition device; and
    when the handsfree incoming control is switched from the control inexecutable state to the control executable while the incoming signal continues being received after the answer suspension notice is given via the answer suspension notice device, the control circuit is further configured to give, via the incoming notice device, an incoming notice for indicating that the incoming signal is being received.

2. The handsfree apparatus according to claim 1, wherein the control circuit is further configured to include a setting portion configured to selectively set either an incoming notifiable mode where an incoming notice is allowed to be given or an incoming not-notifiable mode where an incoming notice is not allowed to be given,
    wherein
    when the cellular phone communication device receives from the cellular phone an incoming notice signal relative to an incoming signal in the control inexecutable state where the handsfree incoming control is inexecutable, the control circuit is further configured to give an answer suspension notice for indicating that an answer to the incoming signal is being suspended, via the answer suspension notice device when the incoming notifiable mode is set by the setting portion.

3. The handsfree apparatus according to claim 2, wherein when the cellular phone communication device receives from the cellular phone an incoming notice signal relative to an incoming signal in the control inexecutable state where the handsfree incoming control is inexecutable, the control circuit is further configured not to give an incoming notice for indicating that an incoming signal is being received when the incoming not-notifiable mode is set by the setting portion.

4. A handsfree apparatus for a vehicle, the apparatus comprising:
    a cellular phone communication device configured to receive, in a state of establishing a communication link with a cellular phone, an incoming notice signal from the cellular phone in connection with an incoming signal having been received by the cellular phone from a communication network;
    a control circuit configured to execute a handsfree incoming control when the cellular phone communication device receives the incoming notice signal from the cellular phone in a control executable state where the handsfree incoming control is executable;
    an incoming notice device configured to give an incoming notice for indicating that an incoming signal is being received;
    an answer suspension notice device configured to give an answer suspension notice for indicating that an answer to an incoming signal is being suspended;
    an incoming history acquisition device configured to acquire an incoming history for indicating that the cellular phone having received an incoming signal from the communication network; and an incoming history notice device configured to give a notice of the acquired incoming history, wherein:

(i) when the cellular phone communication device receives from the cellular phone an incoming notice signal relative to an incoming signal in a control inexecutable state where the handsfree incoming control is inexecutable, the control circuit is further configured to give a suspension notice for indicating that an answer to the incoming signal is being suspended, via the answer suspension notice device;

(ii) when the handsfree incoming control is switched from the control inexecutable state to the control executable state while the incoming signal continues being received after the answer suspension notice is given via the answer suspension notice device, the control circuit is further configured to give, via the incoming notice device, an incoming notice for indicating that the incoming signal is being received; and (iii) when the handsfree incoming control is switched from the control inexecutable state to the control executable state after the incoming signal finishes after the answer suspension notice is given via the answer suspension notice device, the control circuit is further configured to give, via the incoming history notice device, a notice of the incoming history acquired by the incoming history acquisition device.

5. The handsfree apparatus according to claim 4, wherein the control circuit is further configured to include a setting portion configured to selectively set either an incoming notifiable mode where an incoming notice is allowed to be given or an incoming not-notifiable mode where an incoming notice is not allowed to be given, wherein when the cellular phone communication device receives from the cellular phone an incoming notice signal relative to an incoming signal in the control inexecutable state where the handsfree incoming control is inexecutable, the control circuit is further configured to give an answer suspension notice for indicating that an answer to the incoming signal is being suspended, via the answer suspension notice device when the incoming notifiable mode is set by the setting portion.

6. The handsfree apparatus according to claim 5, wherein when the cellular phone communication device receives from the cellular phone an incoming notice signal relative to an incoming signal in the control inexecutable state where the handsfree incoming control is inexecutable, the control circuit is further configured not to give an incoming notice for indicating that an incoming signal is being received when the incoming not-notifiable mode is set by the setting portion.

7. The handsfree apparatus according to claim 4, wherein the control circuit is further configured to determine the control inexecutable state of the handsfree incoming control when an audio output device and an audio input device are being used dedicatedly for other than a handsfree call.

8. The handsfree apparatus according to claim 4, wherein the control circuit is further configured to determine the control inexecutable state of the handsfree incoming control when an anomaly is detected in an audio output device or an audio input device.

* * * * *